Dec. 4, 1928.
H. G. CORDLEY ET AL
SAFETY ATTACHMENT FOR FAUCETS
Filed April 6, 1927
1,693,975
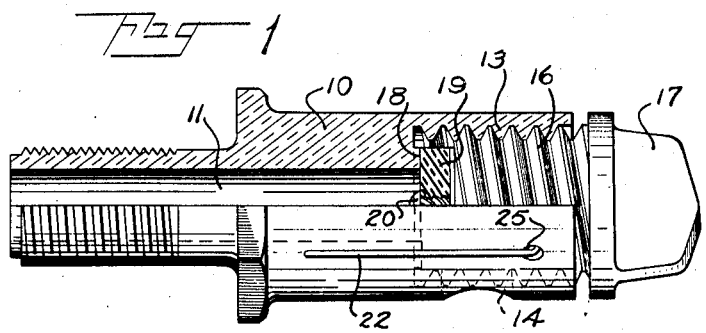
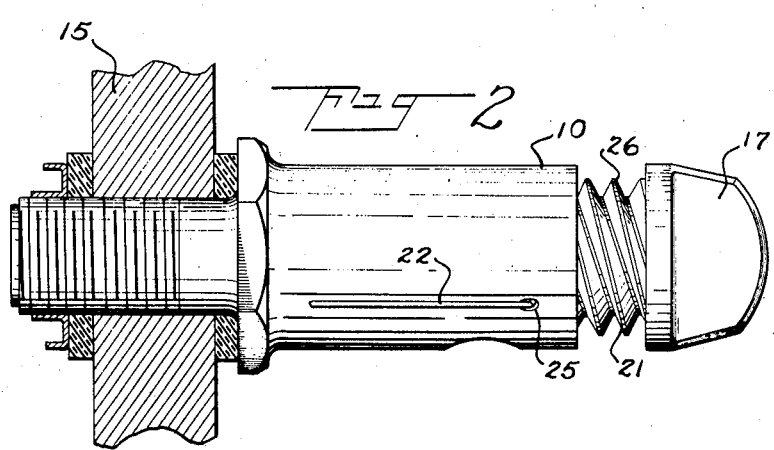
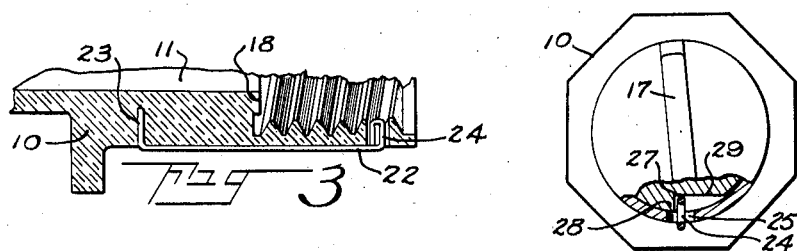
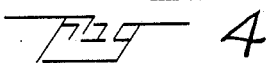
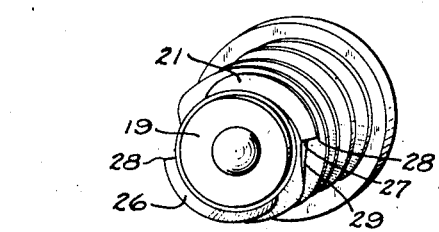
INVENTOR.
Henry G. Cordley
BY and George R. Long
Axel L. Brownrigg ATTORNEY Patented Dec. 4, 1928.

1,693,975

UNITED STATES PATENT OFFICE.

HENRY G. CORDLEY, OF NEW YORK, N. Y., AND GEORGE R. LONG, OF WATERBURY, CONNECTICUT.

SAFETY ATTACHMENT FOR FAUCETS.

Application filed April 6, 1927. Serial No. 181,483.

This invention relates generally to means for preventing the complete removal of a screw threaded device from the structure with which it engages, and more particularly to a means for preventing the loss of a screw threaded valve plug from the faucet structure of which it forms a part.

The particular occasion for the invention herein has arisen in connection with the manipulation of drain faucets of the type such as are used in connection with water cooling devices. In structures of this nature a drain valve device is mounted on the wall of the ice receiving receptacle and the drain valve structure ordinarily includes a removable screw threaded plug member which is mounted in the end of the valve chamber structure and adapted to be manipulated into and out of engagement with a valve seat. The removable end of the screw threaded plug member has resulted in mislaying and loss of the plug member so that drain valve structures of this general nature have been open to objections in actual service.

A general object of the invention herein is to provide means for preventing the complete removal of a screw threaded member from the parts with which it is engaged, a more specific object of the invention being to prevent the complete removal of a valve plug member from the faucet structure in which it is mounted.

Another object of the invention is to provide a drain valve structure formed wholly or for the most part of bakelite or similar material.

The invention comprises the use of a stop or detent which becomes effective when a screw threaded member has been partially removed from its seated engagement with the structure in which it is mounted to prevent further or complete removal of the screw threaded member from the supporting parts.

A feature of the invention resides in the use in connection with a faucet structure of a detent adapted to engage a screw threaded valve plug member in one of its positions to prevent further movement of the valve plug member and thereby prevent complete separation of the valve plug member from the structure with which it cooperates.

Another feature is to provide a stop member of the general type referred to which will automatically prevent complete removal of a screw threaded member from its supporting structure but which can be manipulated when desired to permit complete removal of the member for any purpose.

In a particular example of the invention, which has been chosen for illustration and description, a valve plug member having cooperating engagement with the end of a drain faucet barrel is provided with a recess in its surface with which a spring detent member carried by the barrel engages when the plug member has been withdrawn to a predetermined extent short of complete withdrawal of the plug member from the faucet structure.

Other features of the invention will be hereinafter referred to.

In the drawings, in which a preferred embodiment of the invention has been selected for illustration:

Figure 1 is a view partly in side elevation and partly in section of a faucet structure equipped with an embodiment of the invention;

Figure 2 is a view in side elevation of the faucet shown in Figure 1 with the valve plug member therein withdrawn to a limiting position;

Figure 3 is a sectional view of a detail of a detent member forming part of the invention;

Figure 4 is a view partly in end elevation and partly in section showing the detent member in operation;

Figure 5 is a perspective view of the valve plug member used in connection with the device.

Referring to the drawings for a more detailed description of the invention, a faucet structure is shown which includes a barrel member 10 provided with a bore 11 extending longitudinally therethrough and having an enlarged outer end provided with screw threads 13. In the side wall of the barrel in the region of the enlarged section 11 an opening 14 is formed through which water may pass from the receptacle 15 in the side wall of which the faucet member is mounted.

Mounted in cooperative relation to the screw threaded section 13 is a valve plug member 16 having a finger piece 17 to facilitate manipulation of the valve plug member and to move the inner end thereof into or out of cooperative relation with a shoulder 18 which forms a seat for the valve member, as will be seen. Preferably the valve plug member carries on its inner end a washer 19 formed of any suitable material, such as rubber, fibre, leather, or like material, held in place by a screw member 20. The yielding or elastic nature of the material of the washer provides for the ready removal of the washer from its position beneath the screw head without preliminary withdrawal of the screw. The reverse is also the case, that is, a washer member can be as readily placed in position by snapping the edges of the central opening therein past the edges of the head of the screw 20 in order to mount the washer in position for cooperation with the valve seat 18.

In order to provide a quick opening of the valve with relation to the valve seat 18, the threads 13 on the enlarged section of the bore of the faucet member, as well as the external threads 21 on the screw threaded plug 16, are formed with a double or treble cut and with a relatively large cross section so that a pitch is provided which will provide a desired quickness of longitudinal motion for a relatively small extent of angular turn of the plug member 16.

In order to prevent the complete removal or separation of the valve plug member 16 from its engagement with the enlarged section 13 of the faucet barrel structure 10, a spring detent member 22 is provided which is anchored in the body of the wall of the barrel 10 as at 23. The forward end of the spring detent member 22 is bent back on itself as at 24. The folded portion 24 passes through an opening 25 formed for the purpose in the wall of the barrel member 10. The opening 25 is located in register with one of the threads 26 of the screw thread 13 in the barrel member 10. The thread 21 of the screw plug member 16 is provided with a recess or notch 27 with which the folded end 24 of the detent member 22 engages when the recess portion 27 of the thread 21 is brought into register with the opening 25 in the barrel 10. The result of this is that when the screw plug member 16 has been withdrawn to a position such as is shown in Figure 2 of the drawings, which removes the washer 19 from the valve seat 18 and permits the flow of water through the bore 11 of the faucet structure and out through the opening 14, the detent member engages with the recess 27 in the plug member and locks the plug member against further rotation in the direction of withdrawal of the plug member from its position in the end of the faucet barrel 10.

It will be seen that the detent receiving recess 27 has an abrupt wall 28 on the side which restricts further withdrawal movement of the plug member from its seat. On the other hand, the recess 27 has a sloping or inclined wall 29 on the side which engages the detent member in the rotation of the plug member in a direction to move the plug member to seating relation of the valve. The result of this is that the valve member can be freely manipulated to its closing position and can in turn be withdrawn to an operative position which brings about the engagement of the detent member with the abrupt wall 28 of the recess 27. In other words, the detent member serves to automatically prevent the complete withdrawal of the plug member from its seated relation in the faucet 10 but does not prevent the moving of the plug member to its valve seating relation in the barrel.

In order, when circumstances so require, that the plug member be completely withdrawn from its position in the barrel in order to provide for cleansing the port 11 of the barrel, the spring detent member 22 can be engaged by a suitable tool or by the fingers of the operator and readily withdrawn to a sufficient extent to permit the abrupt wall portion 28 of the recess to pass by the withdrawn folded projection 24 of the detent whereupon the detent may be released and the plug member completely withdrawn in a further turning operation. It will be obvious that the plug member may be reinserted in the threaded section 13 and moved completely to its valve closing position without further manipulation of the detent member 22.

Another feature of the invention resides in the formation of the faucet structure shown of bakelite or similar material. It has been found that structures of this general nature can be produced from bakelite by a type of die casting operation with very satisfactory results. Faucets produced of this material have many advantageous features that do not exist in corresponding structures formed of metal or glass. For example, the material is sanitary, non-brittle, and does not corrode, and, in addition, it is susceptible of being produced in colors or shades to correspond to the equipment with which the faucets are used. Not only can any desired color or shade be provided but the material is adapted to partake of a desirable and attractive finish which renders it particularly useful for the purpose described.

What we claim is:

1. In a loss-preventing device for use with the screw threaded plug member of a faucet structure, a spring detent member mounted on the external surface of the barrel, the wall of the barrel being provided with an opening therethrough in the threaded section thereof, said spring detent member extending through the opening into the interior of the barrel and engaging a thread of the plug member, and the screw threaded plug member being provided with a recess in its threaded portion whereby in a certain position of the plug within the opening the recess will be engaged by the detent to prevent further rotation of the plug member.

2. In a loss-preventing device for use with the screw threaded plug member of a faucet structure, a spring detent member mounted on the external surface of the barrel, the wall of the barrel being provided with an opening therethrough in the region of the threaded section, said spring detent member extending through the opening to the interior of the barrel and engaging the thread of the plug member, the thread of the plug member being provided with a recess adapted to be engaged by the spring detent member to limit rotation of the plug member in a withdrawing movement, said recess being formed to permit rotation of the screw threaded plug member in the other direction, and said spring detent member being capable of being manually withdrawn to permit complete removal of the plug member.

3. A faucet comprising in combination an internally threaded faucet barrel, an externally threaded plug member, a thread of the plug member having near its inner end a recess terminating in an abrupt wall at its inner end and tapered at its opposite end, and a spring detent carried by the barrel member and engageable with said recess to limit the movement of the plug member.

4. A faucet comprising in combination an internally threaded faucet barrel, an externally threaded plug member, a thread of the plug member having near its inner end a recess terminating in an abrupt wall at its inner end and tapered at its opposite end, and a spring detent carried by the barrel and engaging the recessed thread through a hole in the barrel to limit the movement of the plug member but operable to release the plug member to permit removal thereof.

HENRY G. CORDLEY.
GEORGE R. LONG.